(12) United States Patent
Rigler et al.

(10) Patent No.: US 11,639,737 B2
(45) Date of Patent: May 2, 2023

(54) COMPONENT AND METHOD FOR MANUFACTURING A COMPONENT

(71) Applicant: Aktiebolaget SKF, Gothenburg (SE)

(72) Inventors: Franz Rigler, Holzhausen (AT); Oskar Schoeppl, Linz (AT)

(73) Assignee: AKTIEBOLAGET SKF, Gothenburg (SE)

( * ) Notice: Subject to any disclaimer, the term of this patent is extended or adjusted under 35 U.S.C. 154(b) by 1029 days.

(21) Appl. No.: 15/827,090

(22) Filed: Nov. 30, 2017

(65) Prior Publication Data

US 2018/0163781 A1    Jun. 14, 2018

(30) Foreign Application Priority Data

Dec. 9, 2016  (DE) .......................... 102016224595.3
Jan. 20, 2017 (DE) .......................... 102017200959.4

(51) Int. Cl.
  *F16C 33/34* (2006.01)
  *F16C 17/02* (2006.01)
  *F16C 33/04* (2006.01)
  *B21D 53/10* (2006.01)

(52) U.S. Cl.
  CPC .............. *F16C 33/34* (2013.01); *B21D 53/10* (2013.01); *F16C 17/02* (2013.01); *F16C 33/043* (2013.01); *F16C 2206/40* (2013.01); *F16C 2206/44* (2013.01); *F16C 2206/48* (2013.01); *F16C 2206/56* (2013.01); *F16C 2206/60* (2013.01)

(58) Field of Classification Search
  CPC .................................. F16C 33/34; B21D 53/10
  See application file for complete search history.

(56) References Cited

U.S. PATENT DOCUMENTS

| | | | | |
|---|---|---|---|---|
| 4,353,967 A | * | 10/1982 | Hungerford | ........ B29B 17/0005 428/520 |
| 5,102,239 A | * | 4/1992 | Momose | ................. F16C 17/10 384/276 |
| 5,350,788 A | * | 9/1994 | Visioli | ..................... C08J 11/06 524/237 |

(Continued)

FOREIGN PATENT DOCUMENTS

| CN | 201866090 U | | 6/2011 |
|---|---|---|---|
| CN | 104763737 | * | 7/2015 |

(Continued)

OTHER PUBLICATIONS

Don McLeod, Special Section/Resource Management: Success Story: Recycling Spent Aluminum Oxide, Oct. 1, 2008, Ceramic Industry, pp. 1-5 (Year: 2008).*

(Continued)

*Primary Examiner* — Tong Guo
(74) *Attorney, Agent, or Firm* — J-Tek Law PLLC; Scott T. Wakeman; Mark A. Ussai

(57) ABSTRACT

A bearing component, such as a bearing roller or a bearing ring, has an exterior surface and includes at least one interior region made of a recycled material which region is spaced from and does not form any part of the exterior surface. The recycled material and the unrecycled material may each include silicon nitride and/or sialon and/or silicon carbide and/or a ceramic material. Also a method of forming the component.

19 Claims, 1 Drawing Sheet

(56) References Cited

U.S. PATENT DOCUMENTS

| | | | | |
|---|---|---|---|---|
| 2001/0054443 | A1* | 12/2001 | Niwa | C04B 35/111 137/533.11 |
| 2007/0227299 | A1* | 10/2007 | Marchiando | C04B 35/581 75/244 |
| 2009/0230074 | A1* | 9/2009 | Toyoda | B29C 49/0073 215/12.2 |
| 2009/0283208 | A1 | 11/2009 | Liu | |
| 2011/0069917 | A1* | 3/2011 | Yamada | B65G 39/09 384/470 |
| 2015/0139582 | A1 | 5/2015 | Sears et al. | |

FOREIGN PATENT DOCUMENTS

| | | |
|---|---|---|
| CN | 104763737 A | 7/2015 |
| CN | 105765248 A | 7/2016 |
| CN | 106089986 A | 11/2016 |
| DE | 102012212688 B3 | 1/2014 |

OTHER PUBLICATIONS

Ceramic Bearing Technology, 1991, NIST Special Publication 824, pp. 1-240 (Year: 1991).*

Petoskey Plastic, Apr. 27, 2016, pp. 1-7 (Year: 2016).*

Gronostajski et al., Bearing materials obtained by recycling of aluminium, Journal of Materials Processing Technology, 125-126, 2002 (Year: 2002).*

Office Action from the Chinese Patent Office dispatched Apr. 14, 2020 in related Chinese application No. 201711230012.3, and translation thereof.

Search Report from the Chinese Patent Office dispatched Apr. 1, 2020 in related Chinese application No. 201711230012.3, and translation thereof.

* cited by examiner

COMPONENT AND METHOD FOR MANUFACTURING A COMPONENT

CROSS-REFERENCE

This application claims priority to German patent application no. 102016224595.3, filed on Dec. 9, 2016, and to German patent application no. 10 2017 200 959.4, filed on Jan. 20, 2017, the contents of which are both fully incorporated herein by reference.

TECHNOLOGICAL FIELD

The disclosure is directed to a component, such as a roller, or a bearing roller or a bearing ring, that includes a first portion formed from recycled material and a second portion formed from unrecycled material.

BACKGROUND

A component is known that is configured as a ball or a roller of a rolling-element bearing. The ball or roller is comprised of unrecycled ceramic.

It is known from the production of wheels to fill aluminum-alloy wheels with vermiculite. Costs and weight are thereby saved.

SUMMARY

An aspect of the disclosure comprises achieving a high efficiency.

The disclosure is directed to a component that includes at least one region, which is disposed spaced from all surfaces of the component, which region is formed from recycled material.

"Recycled material" is in particular to be understood to mean a material that was at least partially already part of a component of a device or machine, which was already in use, wherein after the use the component has been at least partially dismantled and/or destroyed in order to extract the material. Recycled materials frequently include impurities that are not present in unrecycled (virgin) material. Often, recycled material is not suitable for forming the surface portions of a component because it has less desirable properties than virgin material. A high efficiency can be achieved using an inventive design. In particular, a cost-effective component can be achieved specifically for high quantities and/or medium and large component sizes.

Further advantages arise from the following description of an exemplary embodiment. The description and the claims contain numerous features in combination. The person skilled in the art will also advantageously consider the features individually and in further meaningful combinations.

DETAILED DESCRIPTION

Figure 1:
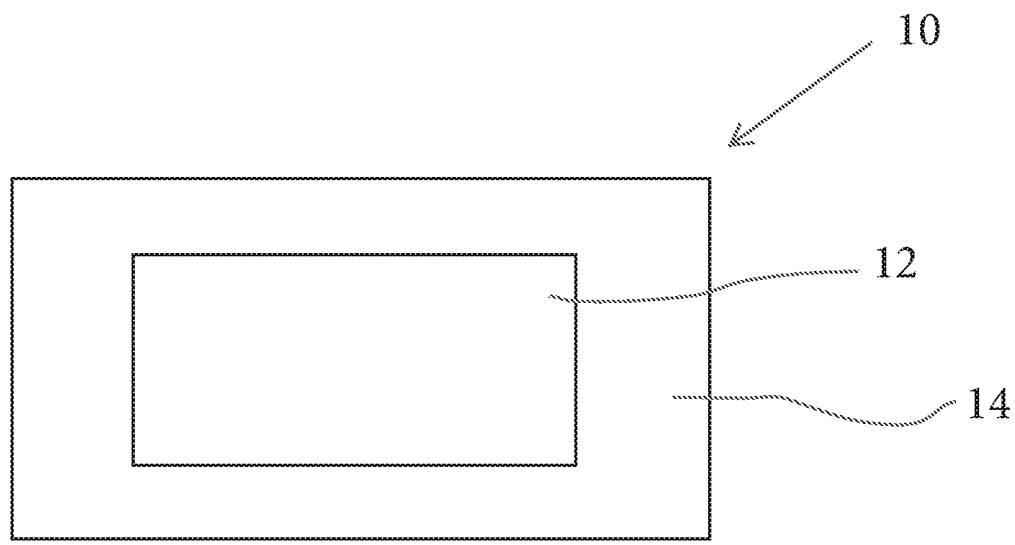
FIG. 1 is a sectional side elevational view schematically illustrating a roller according to an embodiment of the present disclosure.

According to one exemplary embodiment, as illustrated for example, in FIG. 1, a bearing component 10 according to the disclosure is configured as a cylindrical roller of a cylindrical roller bearing. The cylindrical roller includes a first region 12 and a second region 14. The first region 12 has the shape of a circular cylinder and is completely surrounded by the second region 14. A surface of the cylindrical roller is thus completely formed by the second region 14. The first region 12 includes a recycled material that is a ceramic material and comprised of recycled silicon nitride. Recycled silicon nitride contains impurities that differ from impurities of unrecycled silicon nitride. The second region 14 includes an unrecycled material, and specifically unrecycled silicon nitride.

In a method for manufacturing the cylindrical roll the first region is initially shaped and then disposed in a central region of a press tool, wherein the first region is surrounded by powder, which after a pressing of the powder that occurs in the press tool together with the first region, forms the second region.

Figure 2:
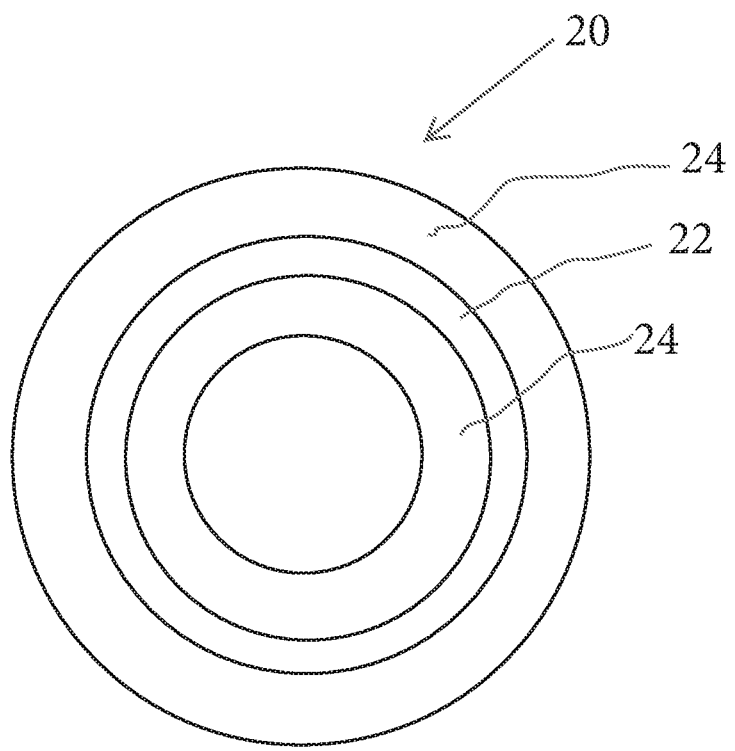
FIG. 2 is a sectional side elevational view of a bearing ring according to an embodiment of the disclosure.

A bearing component may also comprise a bearing ring 20 as illustrated in FIG. 2. The bearing ring 20 may comprise a bearing inner ring or a bearing outer ring or a ring of a plain bearing. The bearing ring 20 includes a first region 22 and a second region 24. The first region is ring-shaped and is completely surrounded by the second region 24. While not illustrated in the sectional view of FIG. 2, the second region 24 surrounds the first region 22 on all sides so that the first region 22 is completely embedded in the second region 24.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved components, such as bearing components.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A bearing component having an exterior surface, the bearing component comprising:
    a cylindrical or annular body including at least one region that comprises a recycled material, the recycled material not forming part of the exterior surface,
    wherein the recycled material is a ceramic material.

2. The bearing component according to claim 1, wherein the recycled material includes silicon nitride and/or sialon and/or silicon carbide and/or a ceramic material that comprises at least one oxide.

3. The bearing component according to claim 2, wherein the at least one oxide comprises aluminum oxide and/or zirconium oxide.

4. The bearing component according to claim 1, further including a second region completely surrounding the first region, the second region being formed of unrecycled material.

5. The bearing component according to claim 4, wherein the unrecycled material comprises silicon nitride and or sialon and/or silicon carbide and/or a ceramic material that comprises at least one oxide.

6. The bearing component according to claim 5, wherein the at least one oxide comprises aluminum oxide and/or zirconium oxide.

7. The bearing component according to claim 1, wherein the bearing component is a rolling-element bearing component or a sliding bearing component or a roller.

8. The bearing component according to claim 1, wherein the bearing component is a rolling element or a bearing ring.

9. The bearing component according to claim 4, wherein the recycled material includes silicon nitride and/or sialon and/or silicon carbide and/or a ceramic material that comprises at least one oxide and the unrecycled material comprises silicon nitride and or sialon and/or silicon carbide and/or a ceramic material that comprises at least one oxide.

10. A method for manufacturing the component of claim 4, comprising:
    placing the recycled material in a central region of a press tool;
    at least partially surrounding the recycled material with the unrecycled material, the unrecycled material comprising a powder that includes ceramic material, and pressing the recycled material and the unrecycled material using the press tool.

11. The bearing component according to claim 1, wherein the recycled material includes silicon nitride and/or sialon and/or silicon carbide.

12. A component comprising:
    a cylindrical body of a recycled ceramic material; and
    a body of an unrecycled material completely surrounding the cylindrical body of recycled ceramic material,
    wherein the body of the unrecycled second material has a cylindrical outer surface.

13. The component according to claim 12, wherein the component is a bearing roller.

14. The bearing component according to claim 12, wherein the recycled material includes silicon nitride and/or sialon and/or silicon carbide.

15. The bearing component according to claim 12, wherein the recycled material includes silicon nitride and/or sialon and/or silicon carbide and/or a ceramic material that comprises at least one oxide.

16. A component comprising:
    an annular body of a recycled ceramic material; and
    an annular body of an unrecycled material completely surrounding the annular body of recycled material,
    wherein the annular body of the unrecycled material has a cylindrical outer surface and a first annular side surface and a second annular side surface.

17. The component according to claim 16, wherein the component is a bearing ring.

18. The bearing component according to claim 16, wherein the recycled material includes silicon nitride and/or sialon and/or silicon carbide and/or a ceramic material that comprises at least one oxide.

19. The component according to claim 16, wherein the recycled material includes silicon nitride and/or sialon and/or silicon carbide.

* * * * *